United States Patent [19]

Choi et al.

[11] 4,083,751
[45] Apr. 11, 1978

[54] CONTINUOUS FEED PYROLYSIS CHAMBER FOR DECOMPOSING SOLID WASTE

[75] Inventors: Charles K. Choi, Claremont; Joseph P. Tassoney, Diamond Bar, both of Calif.

[73] Assignee: Occidental Petroleum Corporation, Los Angeles, Calif.

[21] Appl. No.: 719,273

[22] Filed: Aug. 31, 1976

Related U.S. Application Data

[63] Continuation-in-part of Ser. No. 603,872, Aug. 11, 1975, abandoned.

[51] Int. Cl.² .................... C10B 49/20; C10B 53/02
[52] U.S. Cl. ........................ 202/99; 48/111; 48/209; 201/12; 201/21; 201/33; 110/244; 110/263; 110/346
[58] Field of Search .................... 202/96, 99, 209; 201/2.5, 7, 8, 10, 12, 21, 25, 33, 42; 110/8 R, 8 B, 8 F, 28 J; 259/4 R; 48/111, 209; 165/104 F

[56] References Cited

U.S. PATENT DOCUMENTS

| | | | |
|---|---|---|---|
| 1,969,501 | 8/1934 | Chapman | 110/28 J |
| 2,746,735 | 5/1956 | Bradford | 259/4 R X |
| 3,284,169 | 11/1966 | Tominaga et al. | 23/284 |
| 3,507,626 | 4/1970 | Van Horn | 259/4 R X |
| 3,826,474 | 7/1974 | Pareja | 259/4 R |
| 3,853,498 | 12/1974 | Bailie | 201/12 X |
| 3,874,643 | 4/1975 | Lorenian et al. | 259/4 R X |

*Primary Examiner*—Joseph Scovronek
*Attorney, Agent, or Firm*—Christie, Parker & Hale

[57] ABSTRACT

A pyrolysis reactor decomposes solid organic waste materials by heating the materials with a fast fluidized particulate source of heat which are admitted to one end of a chamber through first and second inlet pipes. The products of decomposition together with the particulate source of heat are removed through an outlet pipe at the other end of the chamber. The chamber has an intermediate section adjacent the inlet pipes of reduced diameter forming a throat which improves the mixing of the heating particles and the organic waste particles for faster heat transfer.

6 Claims, 1 Drawing Figure

U.S. Patent
April 11, 1978
4,083,751
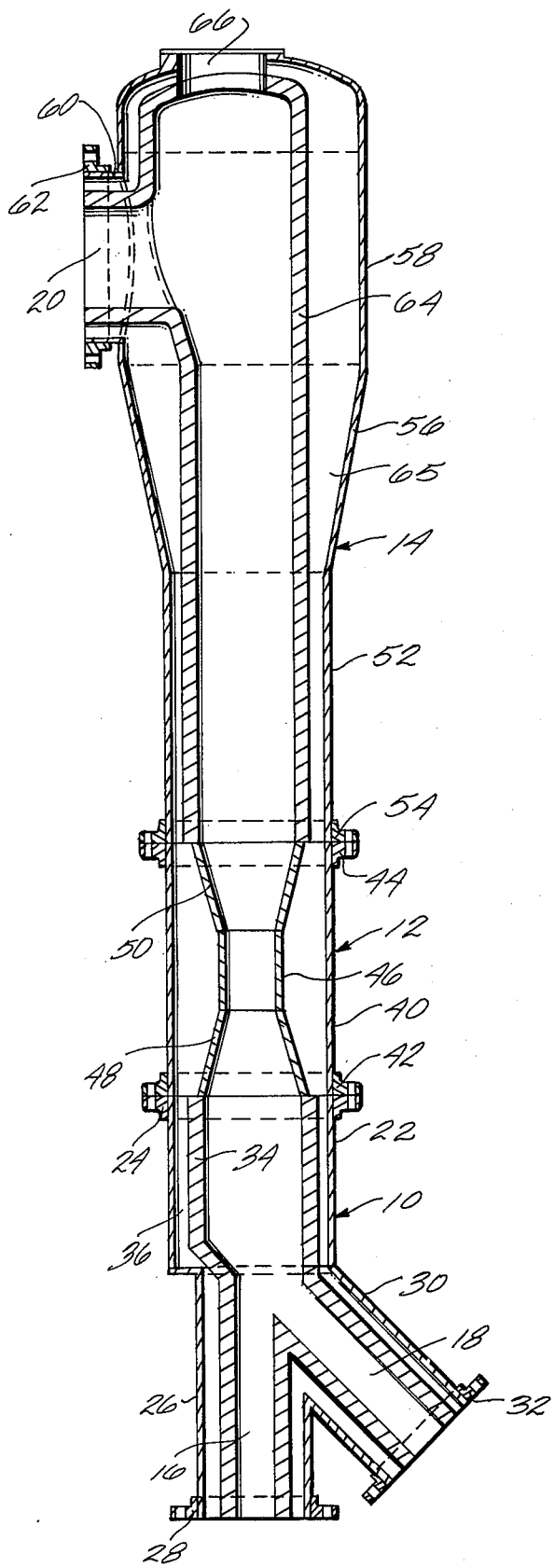

4,083,751

CONTINUOUS FEED PYROLYSIS CHAMBER FOR DECOMPOSING SOLID WASTE

CROSS REFERENCE TO RELATED APPLICATION

This application is a continuation-in-part of our application Ser. No. 603,872 filed Aug. 11, 1975 now abandoned.

FIELD OF THE INVENTION

This invention relates to solid waste disposal systems, and more particularly, to a continuous flow chamber for the pyrolysis of solid organic waste.

BACKGROUND OF THE INVENTION

The disposal of wastes both from municipal and industrial sources, such as trash, rubbish, garbage, animal wastes, agricultural wastes, and waste of plastic processing operations is rapidly becoming of immense national concern. The cost of disposal ranks third behind public schooling and highways as municipal expense in the United States.

It is estimated that each individual in the country generates between 4 and 6 pounds of waste per day, that the industrial output is equivalent to approximately 5 pounds of solid waste per person per day. Previous methods of mass waste disposal, such as landfill, are becoming impossible, while others such as incineration are costly and result in air pollution problems.

A vast majority of the waste which is presently disposed of contains products which are immediately recyclable back into the economy or products into which the waste can be converted for recycle back to the economy. Directly recyclable constituents are the various metals present, such as aluminum and steel, and glass. For the most part, the organic solid waste fraction is subjected to flash pyrolysis as an operation independent of recovery of the directly recyclable inorganic fraction and any organic portion recovered as pulp. Flash pyrolysis yields carbon containing solid residue of pyrolysis or char, condensible pyrolytic oils and combustible gases.

In the flah pyrolysis process, particulate solid organic waste which includes particulate inorganic constituents, a particulate source of heat, the carbon containing solid residue of pyrolysis and/or an inorganic heat source formed by decarbonization of the carbon containing solid residue of pyrolysis, and a carrier gas which is nondeleteriously reactive with respect to the pyrolysis products, are combined and passed under turbulent flow conditions through a pyrolysis zone maintained at a temperature from about 600° to about 2200° F or in the instance of the inorganic heat source, below its fusion temperature, i.e. 1425°–1450° F. The preferred temperature range is from about 800° to about 1350° F. The carbon containing solid residue of pyrolysis with the solid source of heat after separation from the pyrolytic oils and gaseous components is reheated as part of a loop, by total or partial combustion and decarbonized to the particulate source of heat for recycle back to the pyrolysis zone.

In the pyrolysis process, the solid organic waste exists as discrete particles having a diameter less than 1 inch, and are preferably of a size less than about 5 mesh, preferably less than 8 mesh. The particulate source of heat, e.g. the carbon containing solid residue of pyrolysis (char) and/or the inorganic heat source (ash) formed by carbonization of the former, for ease of mass transport, is generally of a particle size in the range from about 10 to about 1,000 microns. Although any carrier gas which is nondeleterious, i.e., essentially oxygen free, to the products of pyrolysis may be used as a transport gas for both the organic solid waste and the particulate source of heat, it is preferred for expediency in the process to use the gases which are the byproducts of the pyrolysis operation itself.

In the process, the organic solid waste which is normally at a temperature from ambient to about 100° F must rapidly be heated to the pyrolysis temperature. Heating of the organic solid waste occurs predominately by solids to solids contact with the particulate inert source of heat. Thorough mixing under solid transport conditions within a fraction of a second becomes essential.

The present invention is directed to an improved pyrolysis reactor which enables a continuous pyrolysis reaction under flow conditions with a single pass of the particulate organic feed in contact with the particulate source of heat within a relatively short chamber at residence times of a fraction of a second.

SUMMARY OF THE INVENTION

The present invention provides a transport flash pyrolysis reactor having an elongated three zoned vessel with first and second inlets at one end and an outlet at the other end. Fast fluidized inert hot particulate source of heat flows continuously through the chamber from one inlet and organic solid waste particles are introduced in the other inlet and combined in a first blending zone where pyrolysis is initiated. Thorough mixing of the particulate solid waste and particulate source of heat is achieved by providing an intermediate zone of reduced cross-sectional area adjacent the blending zone. The reduced cross-sectional area zone substantially increases the relative velocity of the solid particulate source of heat and the organic solid waste to increase the turbulence of the flow and thereby induce intimate mixing to increase the rate of solid-to-solid heat transfer which occurs within the remaining length of the reactor. As a consequence, residence time required for pyrolysis is reduced to a fraction of a second.

DESCRIPTION OF THE DRAWING

For a more complete understanding of the invention, reference should be made to the accompanying drawing, wherein the single FIGURE is a cross-sectional view of the transport flash pyrolysis vessel of the present invention.

DETAILED DESCRIPTION

Referring to the drawing in detail, the transport pyrolysis chamber includes three separate zones or sections, a lower or input section 10 which serves for combining and blending the particulate feed, an intermediate section 12 of reduced diameter and an upper or outlet section 14. The lower section 10 includes a pair of inlet pipes 16 and 18. The upper section 14 includes an outlet pipe 20.

The lower section 10 is constructed from an outer metal pipe 22 terminating in an upper flange 24. The inlet pipe 16 is an axially aligned outer metal pipe 26 terminating in a lower flange 28 for coupling the pyrolysis chamber to a feed of the particulate source of heat (not shown). A second input pipe section 30 forms an acute angle intersection with the inlet pipe section 26 and terminates in a coupling flange 32 for coupling the chamber to a source of solid organic feed particles (not shown). The inlet section 10 is normally constructed with an inner lining of refractory or other suitable heat resistant material, indicated generally at 34. The inner lining 34 is concentric with the pipe section forming the outer metal walls, the intermediate annular space being filled with a suitable high temperature insulating material, as indicated at 36.

The intermediate section of reduced diameter and reduced cross-sectional area 12 similarly has an outer metal pipe 40 terminating at its lower end in a coupling flange 42 and at its upper end in a coupling flange 44. A reduced diameter passage is formed through the intermediate section by an inner metal tubular member formed by cylindrical section 46 from which extends on either side tapered metal frustoconical sections 48 and 50. The cylindrical section 46 and the two conical sections 48 and 50 are formed from suitable heat resistant material such as Inconel. The annular space between the outer metal pipe 40 and the inner venturi-type member is filled with a suitable high temperature refractory type insulating material.

The upper section 14 similarly includes an outer metal pipe 52 having a lower coupling flange 54. The outer pipe 52 has an outwardly tapered section 56 and an upper expanded diameter section 58 to which an outlet pipe 60 is joined in a T-connection. The outlet pipe 60 terminates in an outer flange 62. An inner refractory liner 64 forms an elongated cylindrical chamber, the upper end of which joins the outlet pipe 60. The top of the chamber is provided with a removable access cap 66. The annular space between the outer metal wall and the inner refractory wall is filled with suitable insulation material 65.

The lower section of the pyrolysis chamber above the inlet pipes is of preferably the same internal diameter as the chamber in the upper section 14. This diameter is reduced by the conical sections 48 and 50 down to the reduced diameter of the section 46. The internal diameter of the section 46 is preferably of the order of 0.6 to 0.7 times the internal diameter of the upper and lower sections of the pyrolysis chamber. Moreover, the intermediate section of the reduced diameter is positioned substantially closer to the inlet pipes than to the outlet pipe 60. Three sections form an initial blending zone, an intermediate zone for increasing particle velocity, and a final pyrolysis zone. All operate under turbulent flow conditions with Reynolds number being maximized in the intermediate zone.

In operation, organic feed is admitted into the inlet pipe 18 and along the axis of the reactor. The organic feed is in the form of solid particles preferably of 8 mesh or less in size. The organic particles are mixed with sufficient product gas or other gas which is nondeleteriously reactive with the products of pyrolysis to fluidize the particles and move them upwardly into a pyrolysis chamber. The particulate source of heat, which may be the carbon containing solid residue of pyrolysis or "char" and/or an inorganic heat source formed from decarbonization of the carbon containing solid residue of pyrolysis or "ash" is admitted to the pyrolysis chamber through the inlet 16 at an angle to the feed of the solid waste. The weight ratio of inert particulate source of heat to the organic feed particles is typically in the range of 2:1 to 10:1 or more. The temperature of pyrolysis, while possibly limited by the softening point of the particulate source of heat, is typically in the range of about 600° to 2200° F, preferably about 800° to about 1350° F. The organic solid waste typically enters the pyrolysis chamber at a temperature of about 100° F and the particulate source of heat enters at a temperature higher than the pyrolysis temperature. The inert particulate source of heat and organic waste converge in the lower chamber and are blended. Pyrolysis of the organic waste is initiated. To achieve thorough mixing to perfect required short residence time pyrolysis, they are accelerated through the intermediate constricted section. The Reynolds number for the fluid flow through the venturi section is substantially double that for the rest of the pyrolysis chamber, resulting in high agitation and, therefore, a much more thorough and intimate mixture of the very hot particulate source of heat and the particles of organic solid waste. The velocity of flow produces a Reynolds number of about 50,000 to about 500,000 or more in the lower and upper chambers and about 100,000 to about 1,000,000 or more in the restricted section, the flow rate being above the critical Reynolds number for laminar flow. As a result, the temperature of the organic feed particles is quickly raised in the pyrolysis chamber by heat transfer from the particulate source of heat to the temperature at which pyrolysis of the organic solid waste into gas, carbon containing solid residue of pyrolysis, and oil products takes place. The gas and oil products and solids exit at the outlet of the pyrolysis chamber.

By providing the intermediate restricted section, heat transfer between the hot inert particles and the organic feed particles is greatly enhanced, permitting the overall length of the pyrolysis chamber to be substantially reduced as well as reducing the residence time of the particles in the pyrolysis chamber. For example, a pyrolysis chamber of 12 feet in length between the inlet and outlet may be operated with complete pyrolysis at total residence times of 0.2 second. Thus, a relatively compact high volume flash pyrolysis unit is provided which enables heat transfer between two solid constituents in extremely short times.

What is claimed is:

1. A pyrolysis reactor for the transport pyrolysis of particles of solid organic waste by heating by gas fluidized hot solid particles comprising a tubular chamber formed of lower tubular blending section, an intermediate tubular particles acceleration section and upper tubular section in which:

(a) the lower tubular blending section has an enclosing lower end coupled at said lower end in communicating relation to a first inlet pipe, said first inlet pipe provided for admitting the gas fluidized hot solid particles and coupled in communicating relation to a second inlet pipe positioned at an acute angle to the first inlet pipe, said second inlet pipe for introduction of the particles of solid organic waste, and coupled at its upper end in communicating relation to said tubular intermediate particles acceleration section by a frustoconical section, the portion of the lower tubular blending section between the enclosing lower end and the intermediate tubular particles acceleration section forming the section for blending the particles of solid organic waste and the gas fluidized hot solid particles in initial pyrolyzing combination;

(b) the intermediate tubular particles acceleration section is coupled to the upper tubular section and has a diameter less than the diameter of the lower tubular blending section to increase velocity of particle flow of solid waste and hot solids relative to velocity of particle flow in the lower tubular blending section to promote mixing of particles passing from the lower tubular blending section to the upper tubular section; and (c) the upper tubular section has a diameter, greater than the diameter of the intermediate tubular particles acceleration section, an enclosing upper end, and has an outlet pipe adjacent said enclosing upper end, said tubular upper section for completion of pyrolysis of said particulate solid organic waste.

2. Apparatus of claim 1, the first and second inlet pipes converging to form a common opening into said lower tubular section.

3. Apparatus of claim 2 wherein the inner walls of the chamber are conically tapered on both sides of said intermediate tubular section.

4. Apparatus of claim 3 wherein the diameter of the tubular intermediate section is of the order of 0.6 to 0.7 times the diameter of said upper tubular and lower tubular sections.

5. Apparatus of claim 4 wherein the first inlet pipe is axially aligned with the chamber.

6. Apparatus as claimed in claim 1 in which the lower tubular blending section, the intermediate tubular particles acceleration section and upper tubular section are surrounded by an outer tubular shell radially spaced from each of said sections and including insulation between said outer tubular shell and said lower tubular blending, intermediate tubular particles acceleration and upper tubular sections.

* * * * *

UNITED STATES PATENT AND TRADEMARK OFFICE
CERTIFICATE OF CORRECTION

PATENT NO. : 4,083,751

DATED : April 11, 1978

INVENTOR(S) : Charles K. Choi and Joseph P. Tassoney

It is certified that error appears in the above-identified patent and that said Letters Patent are hereby corrected as shown below:

Column 1, line 44, for "flah" read -- flash --.
Column 5, line 7, delete "," after -- diameter --.

Signed and Sealed this

Fifteenth Day of August 1978

[SEAL]

Attest:

RUTH C. MASON
Attesting Officer

DONALD W. BANNER
Commissioner of Patents and Trademarks